United States Patent [19]

Lenz et al.

[11] 4,098,595

[45] Jul. 4, 1978

[54] PROCESS FOR THE PRODUCTION OF GRANULAR QUARTZ GLASS

[75] Inventors: Arnold Lenz, Cologne-Stammheim; Gerhard Kreuzburg, Niederkassel; Rainer Haase, Bokel, Oldenburg, all of Germany

[73] Assignee: Dynamit Nobel Aktiengesellschaft, Troisdorf, Germany

[21] Appl. No.: 752,715

[22] Filed: Dec. 20, 1976

[30] Foreign Application Priority Data

Dec. 22, 1975 [DE] Fed. Rep. of Germany ....... 2557932

[51] Int. Cl.$^2$ ..................... C03B 23/20; C03C 15/00
[52] U.S. Cl. ............................ 65/17; 65/18; 65/30 R; 65/134; 65/DIG. 8; 65/DIG. 14; 106/52; 106/73
[58] Field of Search ............... 65/DIG. 14, 17, 30 R, 65/18, 134, DIG. 8; 106/52, 73

[56] References Cited

U.S. PATENT DOCUMENTS

| | | | |
|---|---|---|---|
| 3,597,252 | 8/1971 | Schroder et al. | 65/17 X |
| 3,827,893 | 8/1974 | Meissner et al. | 106/52 X |
| 3,847,583 | 11/1974 | Dislich et al. | 65/DIG. 14 |
| 3,853,673 | 12/1974 | Levene | 65/DIG. 14 |
| 3,867,156 | 2/1975 | Fukumoto et al. | 65/DIG. 14 |
| 3,948,629 | 4/1976 | Bartholomew et al. | 65/DIG. 14 |
| 3,958,073 | 5/1976 | Trevisan et al. | 65/30 R X |
| 4,028,085 | 6/1977 | Thomas | 65/DIG. 14 |
| 4,030,938 | 6/1977 | Thomas | 65/134 X |
| 4,042,361 | 8/1977 | Bihuniak et al. | 65/DIG. 14 |

OTHER PUBLICATIONS

Dec. 1971 Journal of the American Ceramic Society – Discussions and Notes, pp. 634, 640, vol. 51, No. 12 Title Gel Route to Homogeneous Glass Preparation.

*Primary Examiner*—Richard V. Fisher
*Assistant Examiner*—Frank W. Miga
*Attorney, Agent, or Firm*—Burgess, Dinklage & Sprung

[57] ABSTRACT

Method of preparing granular quartz glass which comprises heating a porous granulated silica gel having an alkoxy group content equal to or less than 1 weight percent and a total impurity content of less than 1 part per million, the porous granulated silica gel obtained by hydrolysis of an orthosilicic acid ester of an aliphatic alcohol at a temperature up to 1400° C.

15 Claims, No Drawings

PROCESS FOR THE PRODUCTION OF GRANULAR QUARTZ GLASS

BACKGROUND OF THE INVENTION

1. Field of the Invention

This invention relates to a process for the production of granular quartz glass by the thermal treatment of silica gels obtained by hydrolysis of orthosilicic acid esters of aliphatic alcohols. More especially this invention relates to the preparation of fused silica, i.e., pure silicite glass by a process involving the hydrolysis of a silicic acid ester obtained by reaction of silicon or ferrosilicon with a $C_1$-$C_2$ aliphatic alcohol, with an excess amount of water whereby to prepare a silica sol, effecting gelation of the silica sol and preparation of fused silica quartz glass therefrom by heating at increasing temperatures up to 1400° C.

2. DISCUSSION OF THE PRIOR ART

The subject of the invention is a process for the production of granular quartz glass by the thermal treatment of silica gels obtained by a hydrolytic method from orthosilicic acid esters.

It is known to produce quartz glass by melting rock crystal of natural origin. Since rock crystal, as a natural product, contains impurities, such as, for example, iron, titanium and aluminum compounds and calcium, magnesium and alkali compounds, it must be refined, especially if it is to be used for optical purposes. Even the types of rock crystal which are considered to be of high purity cannot be used for the production of fused quartz glass without complicated purification processes. Even small amounts of impurities, such as iron, titanium and other metals in amounts of a few parts per million will impair transparency to ultraviolet rays. Also undesirable is the hydroxyl group content, which produces an absorption in the infrared range.

Therefore, many attempts have been made to produce quartz glasses by synthetic methods.

For example, it has been attempted to obtain quartz glass by melting precipitated silicic acid gels, but this yields melts which are bubbly.

For the prevention of bubbles it is proposed in German Pat. No. 1,596,473 to treat precipitated silicic acids with silicon tetrachloride at elevated temperature, and thus to eliminate the residual water which produces the bubbles. This known procedure is difficult and expensive. The use of silicon tetrachloride requires especially designed apparatus to prevent corrosion and environmental pollution. It is also especially disadvantageous that the precipitated silicic acid cannot be prepared with the required high purity.

It has also been proposed to produce high-purity silicic acid gel from tetraethoxysilane, and transform it to silicon dioxide by sintering at 650° to 750° C (Che. Inc., USSR, 1969, No. 6, pp 47 (447) – 49 (449)). Such a product is said to be able to be melted to form bubble-free quartz glass. The disadvantage of this known method lies, on the one hand, in the difficult purification of the ester, and, on the other, in the low yield of silicic acid gel due to the great excess of water, and in the long gelling times. Since the tetraethoxysilane is prepared from silicon tetrachloride, it is contaminated by various elements in the form of chlorides. It is therefore proposed in this publication to purify the ester first by combined treatment with chelating reagents and active carbon, and then to complete the purification by the absorptive capacity of the silicic acid in statu nascendi with partial hydrolysis of the ester. The ester is then reacted in the acid medium to form silicic acid sol, and brought to gelation by the addition of ammonia water. The hydrolysis of the ester is performed with a 24-fold excess of water.

Is is also known to react silicon tetrachloride with oxygen at elevated temperatures to form silicon dioxide, and to use the silicon dioxide as the starting product for the preparation of fused quartz glass. This process, however, is very expensive and difficult to perform technically on account of the formation of chlorine.

It is an object of this invention, therefore, to provide a process by which bubble-free, high-purity quartz glass is produced, and which at the same time does not have the disadvantages of the prior art processes.

SUMMARY OF THE INVENTION

Problems attendant the prior art processes are solved in accordance with the invention which provides a method of preparing granular quartz glass method itself comprises heating a porous, granulated silica gel having an alkoxy group content equal to or less than 1 weight percent and a total impurity content of less than 10 ppm, preferably less than 1 ppm the porous granulated silica gel obtained by hydrolysis of an orthosilicic acid ester of an aliphatic alcohol, at a temperature up to 1400° C.

This invention therefore relates to a process for preparing quartz glass by the steps of:

A. Forming a silicic acid ester of an aliphatic alcohol by reacting silicon or ferrosilicon with a $C_1$-$C_2$ aliphatic alcohol;

B. Hydrolyzing the silicic acid ester by contacting the same with 105–500% of the stoichiometrically necessary amount of water, the water having a pH of 2–5 to thereby form a silica sol;

C. Gelling the silica sol by subjecting it to an elevated temperature up to 100° C;

D. Drying the gel by heating it at increasing temperatures up to 300° C;

E. Comminuting the so dried gel; and

F. Heating the so comminuted gel at increasing temperatures which can be up to a temperature of 1400° C.

The problems attendant the prior art processes for quartz glass preparation are therefore solved in that the quartz glass is made from a silica gel obtained by hydrolysis of an orthosilicic acid ester of an aliphatic alcohol which gel is transformed through a special thermal treatment to granular quartz glass which can be melted to a bubble-free quartz glass.

In accordance wirh the invention, porous, granulated silica gels are used having alkoxy group contents of one percent by weight or less, preferably from less than 0.5 to 0.1% by weight, and total impurities, especially chlorine ion contents, of less than one part per million, and they are sintered at temperatures increasing to 1400° C to form a granular quartz glass.

It should be understood that sintering temperatures of less than 1400° C can be employed. Generally speaking, the sintering temperature is at least >750° and up to 1400° C preferably 1000° to 1200° C.

In the performance of the process of the invention, those porous silica gels are preferentially sintered to form granular silicon dioxide glass which have been prepared by hydrolyzing orthosilicic acid esters of aliphatic alcohols, e.g. $C_1$ to $C_5$- aliphatic alkohols or $C_2$ to $C_5$ - glycols, preferably aliphatic alcohols, of 1 or 2 carbon atoms, or corresponding polyalkyl silicates, preferably tetramethyl silicate, by means of acidified water. Of the orothosilicic acid esters contemplated it is preferred that they be orthosilicic acid esters of alkanols, especially $C_1$-$C_2$ alkanols. If desired, the hydrolysis can be performed in the presence of easily boiling alcohols, which can best be the alcohols which were released by the hydrolysis, for example, for the purpose of obtaining a longer-lasting sol. However, the hydrolysis is preferably performed without the addition of alcohol.

For the achievement of the completest possible hydrolysis, the water (in accordance with the formula $Si(OR)_4 + 2H_2O = SiO_2 + 4ROH$) is used in an excess, preferably in amounts of 105 to 500%, especially 200 to 300%, of the stoichiometrically necessary amount.

The hydrolysis mixture is stirred until the sol is formed. Then the sol is brought to gelation at elevated temperatures, preferably 100° C or more, e.g., 70° to 100° C, for, say, 10 to 180 minutes, preferably 10 to 20 minutes, and the silica gel that is formed is dried at normal pressure at temperatures between 100° and about 300° C, and then it is crushed. The resultant silica gel contains, after drying is completed, 1% alkoxy groups or less, and preferably from less than 0.5 to 0.1% by weight. The silica gel to be sintered should best be in grain sizes of 0 to 10000 μm, especially 0–800 μm, preferably 70 μm to 800 μm.

In the gelation, and preferably also in the drying of the silica gel that follows, it is desirable to provide for shielding with a pure, inert, oxygen-free gas, preferably pure nitrogen, to prevent danger to the environment and to lessen the risk of explosion.

As soon as a homogeneous solution has formed after the components have been combined (orthosilicic acid ester plus acidified water) the gelation is performed and the subsequent drying without further stirring.

It has been found that for the purposes of the invention, especially those orthosilicic acid tetraalkyl esters are suitable which are not prepared by the reaction of silicon tetrachloride with the corresponding alcohols. Such a process is described in German Pat. No. 1,793,222, wherein one sets out from silicon or ferrosilicon or the like, which is reacted with alcohols at elevated temperatures in th presence of the corresponding alcoholate. It is desirable to purify the ester by distillation. An ester is then obtained having an ion content smaller than one part per million. In the process of the invention, we set out preferably from these high purity esters, especially the orthosilicic acid tetramethyl ester.

Basically, it is also possible to use for the hydrolysis orthosilicic acid tetraalkyl esters in which the alkyl group has 2 to 8 carbon atoms; if desired, the carbon chain can be interrupted by one or more oxygen atoms.

If desired, the corresponding polyalkylsilicates can be used as starting products for the process of the invention, and of these polymethylsilicate is preferred. The preparation of such polyalkylsilicates can be accomplished, for example, by performing a partial hydrolysis by the addition of a less than stoichiometric amount of water, advantageously removing the liberated alcohol by distillation (normal pressure or vacuum), and proceeding in accordance with the invention.

In the process of the invention, the hydrolysis is performed in an acid medium. The water used for the hydrolysis should have a pH between 2 and 4, and preferably about 3, and should be of the highest possible purity (total contamination with ions less than 1 ppm). The acids that are used are preferably volatile organic acids, preferably formic and acetic acid or mixtures thereof.

The dried, granulated silica gels made in the above-described manner, which are subjected to heat treatment up to 1200° C, and in some cases up to 1400° C., are porous and have specific surface areas, measured in accordance with BET, of approximately 400 to about 800, and preferably from 500 to 700 square meters per gram.

It has proven to be desirable to cause the sol to gel, in a flat dish for example, at temperatures which are higher than the boiling temperature of the alcohol that evolves, e.g., 70° to 100° C., but at temperatures at which the loss of hydrolysis water through evaporation will be minimized during the gelation procedure. Furthermore, the temperature should be kept so low that boiling of the reaction mixture will be avoided. Then the drying of the gel follows. The drying is best performed carefully, preferably at lowly increasing temperatures between 100° to about 300° C. The drying is continued until the silica gel achieves a free-flowing state.

During the drying and gelation, it is desirable to pass a pure, dry shielding gas, preferably an oxygen-free shielding gas, especially nitrogen, over the silica gel being dried. It is desirable to warm the shielding gas before use.

The gels obtained after drying can be comminuted to the desired grain size prior to sintering. Basically, the comminution can be performed mechanically, e.g., by grinding or the like. In this case, however, there is the danger of contamination. It has been found that these difficulties can be reduced by treating the dried gels with water (room temperature, normal pressure, total contamination by ions less than 1 ppm). The larger granules shatter upon treatment with water. Only the excessively large grains remaining then need to be crushed mechanically to the desired grain size. By this procedure the danger of contamination is reduced.

On account of their great purity and the low alkoxy group content, such gels have proven especially suitable for the production of quartz glass granules which can be melted to produce bubble-free quartz glass.

Depending on the amount of water used for the hydrolysis, it is desirable in many cases to subject the silica gel, after drying it at temperature up to about 200° C., to a heat treatment for a brief period, preferably at temperatures from 200° to 400° C, especially at about 300° C.

During the thermal treatment following the drying operations, care must be taken that the temperature increase up to the actual sintering temperature (about 1000° to 1400° C.) does not take place too rapidly.

In a preferred embodiment of the process of the invention, therefore, it is proposed that the thermal treatment be performed at temperatures increasing step by step. For example, the silica gel that has been dried at temperatures up to 200° C., or which in some cases has been heat treated at temperatures of 200° to 400° C., is heated slowly, e.g., over a period of 2 to 5 hours, up to a temperature between 500° to 800° C., and is presintered at this temperature for so long that, in the subsequent sintering between 1000° and 1400° C., clear silicon dioxide glass granules are formed. The optimum presintering time is best determined by preliminary experiment. After the presintering, the temperature is increased to about 1000° to 1400° C., preferably 1200° C., and the material is left at this temperature until the sintering is completed and the resultant quartz glass granules can be melted down to bubble-free quartz glass.

By the step-wise thermal treatment, in which the temperature increase should be achieved slowly until the desired stage is reached, the pores are prevented from closing up prematurely during the presintering process, i.e., insuring that the remaining alkoxy groups and hydroxyl groups, which would interfere with the subsequent melting to quartz glass, are largely removed from the pores.

The comminution of the quartz glass granules obtained upon completion of the sintering is generally not necessary before they are melted down to quartz glass. If desired, any particles that might have become sintered superficially together can be separated from one another by light pressure.

The sintering is performed in electrical or gas-heated furnaces, the gel to be sintered being contained in refractory vessels, preferably in dishes or crucibles of clear or opaque fused silica.

The sintering can basically also be accomplished with high throughputs in an indirectly heated fluid bed, or in a fluid bed powered steadily or pulsatingly by combustion gases. Likewise, the after-drying and sintering can be performed in indirectly or directly heated revolving drum ovens. Also, a combination of the above-named process steps leads to clear-melting quartz glass granules.

Also the hydrolysis as well as the subsequent gelation and drying to the silicic acid gel for sintering is best performed in vessels of clear or opaque fused silica so as to prevent contamination by foreign metals and the like.

When the sintering has been completed, the quartz glass granules have hydroxy group contents generally of less than 100 ppm, and alkoxy group contents below the limit of analytic detection, i.e., they are free of alkoxy groups.

Due to their high freedom from foreign ions, and to their low hydroxyl ion content, the quartz glass granules prepared by the process of the invention can be melted to form bubble-free quartz glass. The resulting quartz glasses can be used for optical applications. They are furthermore suitable for all applications in which high freedom from foreign ions, hydroxyl ions, and bubbles is required, as for example in the production of melting crucibles or tubes used for the manufacture of semiconductor monocrystals and the like. The quartz glass granules can also be sintered to shaped articles by methods known in the art.

In order to more fully illustrate the nature of the invention and the manner of practicing the same, the following examples are presented:

EXAMPLES

Example 1

To 1 mole of tetramethyl silicate (approx. 98 wt.-% pure, balance methanol), 108 ml of water (6 moles, 300% of the amount of water stoichiometrically required, total ion content less than 1 ppm) is added with stirring. The water had previously been brought to a pH of 3 by the addition of 0.02 ml of 99% formic acid. The mixture is stirred. After a few minutes the mixture warms and a homogeneous solution is obtained. This solution is brought to gelation in the drying oven in a flat quartz glass disk at 100° C., under a shield of pure nitrogen. The gelation is completed after 30 minutes. The gel is dried for about 4 hours at 180° to 200° C. The heating is regulated such that the temperature of 180° C. is reached in 3½ hours.

Water is poured over the gel that has formed and then the gel is again freed of adherent water at 180° to 200° C. The specific surface area amounts to 650 m$^2$/g, measured by the BET method. The alkoxy group content is 0.2 wt.-% (total impurities less than 0.1 ppm).

This gel is then heated over a period of 4 hours to 750° C., and let stand at this temperature for 8 hours. Then the temperature is increased over a period of about 2 hours to 1100° C. The gel is held at this temperature for 8 hours. The granules that formed could be melted to form a bubble-free quartz glass.

Example 2

In the preparation of the silicic acid gel, the same procedure described in Example 1 is followed. The gel obtained after 2 hours of drying at 300° C. is slowly heated in an electric furnace to 1000° C. The heat input is controlled such that the temperature of 1000° C. is reached by a continuous increase over a period of about 12 hours. The gel is held at this temperature for 12 hours. Then it is brought, over a period of 1 hour to temperatures of 1100° C., and held at this temperature for another 8 hours. A bubble-free quartz glass granular product is obtained, which can be melted down in a bubble-free manner.

What is claimed is:

1. A process for preparing quartz glass which consists essentially of:
    A. Forming a silicic acid ester of an alcohol selected from the group consisting of a $C_1$–$C_5$ aliphatic alcohol, a $C_2$–$C_8$ alkanol wherein the carbon chain of the alkyl group can be interrupted by one or more oxygen atoms and a $C_2$ to $C_5$ glycol by reacting silicon or ferrosilicon with said alcohol;
    B. Hydrolyzing said silicic acid ester by contacting the same with 105–500 percent of the stoichiometrically necessary amount of water, said water having a pH of 2–5 to thereby form a silica sol;
    C. Gelling said silica sol by subjecting it to an elevated temperature up to 100° C;
    D. Drying said gel by heating at increasing temperatures up to 300° C;
    E. Comminuting the so dried gel; and
    F. Heating the so-comminuted gel at increasing temperatures which can be up to a temperature of 1400° C.

2. A method according to claim 1 wherein said silica gel has a total impurity content of less than 1 ppm.

3. A method according to claim 1 wherein said silica gel has a given size of up to 10,000 μm.

4. A method according to claim 1 wherein said porous silica gel has a specific surface area, determined by the BET method, of 400 to 800 m$^2$/g.

5. A method according to claim 4 wherein said porous silica gel has a specific surface area, determined by the BET method, of 500 to 700 m$^2$/g.

6. A method according to claim 1 wherein the silica gel is comminuted to particles of grain size 70 to 800 μm.

7. A method according to claim 1 wherein the gelation and drying are carried out under a protective gas shield.

8. A method according to claim 1 wherein the hydrolysis is performed with constant stirring until the sol is prepared.

9. A method according to claim 1 wherein said silicic acid gel is treated, after drying, with pure water at atmospheric pressure, comminuted in the presence of said pure water and thereafter freed of adherent water.

10. A method according to claim 1 wherein following said drying said gel is heated at stepwise or continuous increasing temperatures which can be up to 1400° C.

11. A method according to claim 1 wherein said gel is heated at stepwise or continuous increasing temperatures which can be up to 1200° C.

12. A method according to claim 1 wherein after said drying and prior to heating stepwise or continuous to 1400° C said gel is presintered at a temperature of 500° to 800° C.

13. A method according to claim 1 wherein said orthosilicic acid ester is a high purity, chlorine ion-free orthosilicic acid ester.

14. A method according to claim 1 wherein said ester is an ester of methyl alcohol.

15. A process according to claim 1 wherein step F is carried out at a temperature of at least 750° C.

* * * * *